United States Patent Office.

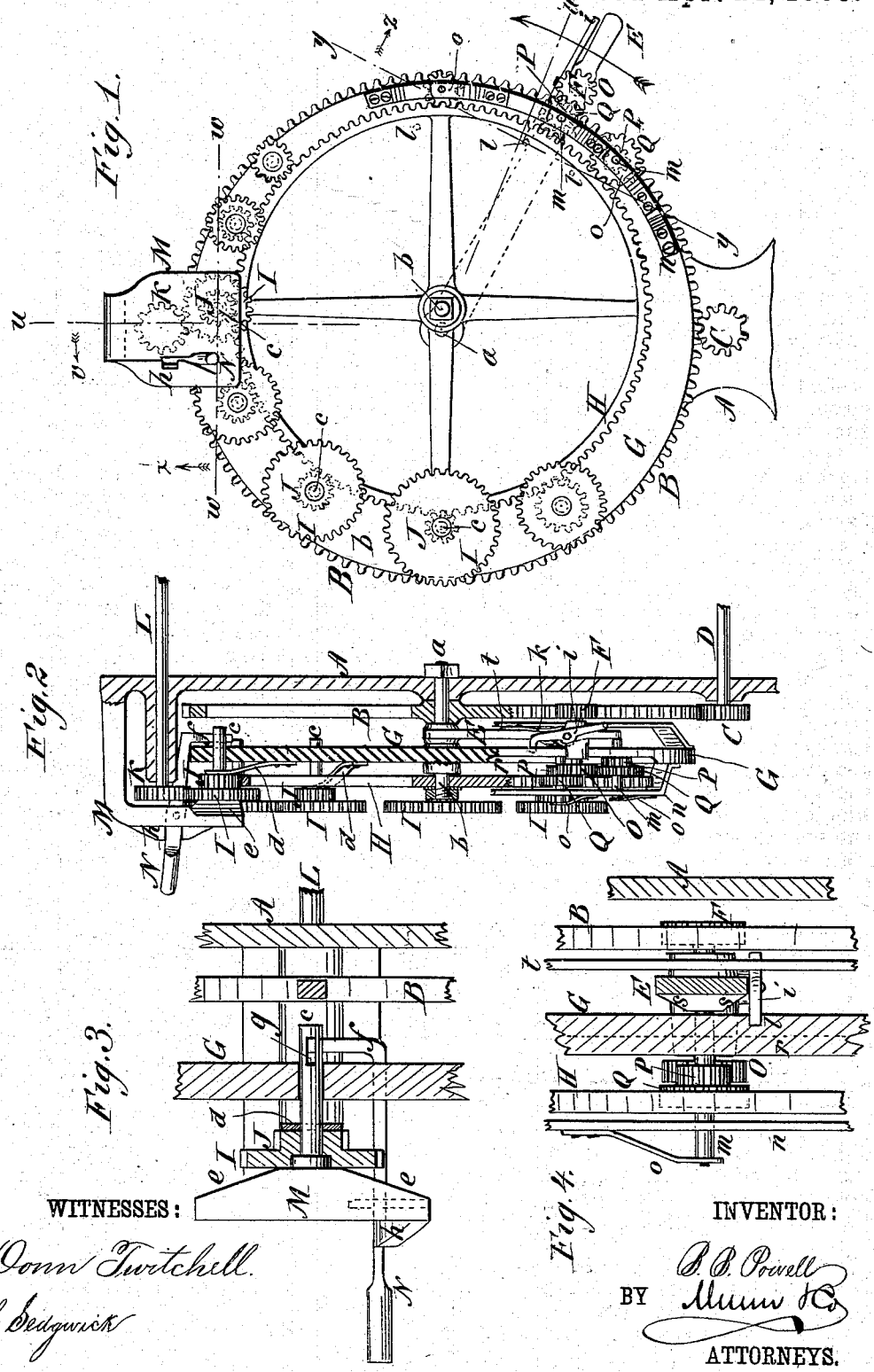

BENJAMIN B. POWELL, OF PETOSKEY, MICHIGAN.

SPEED-CHANGING MECHANISM.

SPECIFICATION forming part of Letters Patent No. 276,463, dated April 24, 1883.

Application filed September 27, 1882. (No model.)

*To all whom it may concern:*

Be it known that I, BENJAMIN B. POWELL, of Petoskey, in the county of Emmet and State of Michigan, have invented certain new and useful Improvements in Speed-Changing Mechanism, of which the following is a full, clear, and exact description.

This invention has for its object the changing of the number of revolutions within a given time of a shaft, when driven by another shaft having a fixed number of revolutions within the same time, and is more particularly intended as a thread-cutting and feed gear for lathes, and will here be described accordingly; but it is also applicable to other purposes in which a change of speed is necessary.

The invention consists in certain combinations of gears and devices, including a duplicate series of differential wheels and pinions carried by a blind wheel or disk, an eccentric spur-wheel connected with said blind-wheel, and other gears and levers for engaging, disengaging, and changing the gearing of the wheels and pinions, whereby a very compact and efficient mechanism is obtained for changing the velocity of the driven shaft relatively to the driving-shaft, substantially as hereinafter described.

Reference is to be had to the accompanying drawings, forming part of this specification, in which similar letters of reference indicate corresponding parts in all the figures.

Figure 1 represents an end view of an iron lathe-head with my improved thread-cutting and feed gear applied. Fig. 2 is an irregular partly-vertical section upon the line $u\,u$ in Fig. 1, looking in direction of the arrow $v$. Fig. 3 is a horizontal section upon the line $w\,w$ in Fig. 1, looking in direction of the arrow $x$; and Fig. 4, a section upon the line $y\,y$ in Fig. 1, looking in direction of the arrow $z$. Figs. 3 and 4 are upon larger scales than Figs. 1 and 2.

A in the drawings indicates the head of the lathe or support, having a center-pin, $a$. Upon this pin is loosely fitted next to the lathe-head a spur-wheel, B, which engages with a pinion, C, on the lathe-screw D, or shaft which represents the lathe-screw. Next to and outside of this spur-wheel B is also loosely fitted upon the center-pin $a$ a lever, E, carrying a pinion, F, which gears with the cogs of the spur-wheel B. Outside of the lever E, loose upon the center-pin $a$, is a plain disk or wheel, G, which has no teeth upon its periphery, and the diameter of which corresponds to the size of the wheel B inside of its cogs. This wheel G, I term a "blind-wheel." Outside of this blind-wheel and projecting from an eccentric pin, $b$, thereon is a spur-wheel, H, of about three-quarters the size of the blind-wheel, (more or less,) and set enough to one side of the center of the blind-wheel to admit, when the blind-wheel is turned for the purpose, of any one of a series of different-sized toothed wheels, I, carried by the blind-wheel and extending fully to the outer rim of said wheel, engaging with a pinion, K, on the driving-shaft or lathe-spindle L, and of any one of a series of different-sized pinions, J, fast upon the spindles $c$ of the wheels I, and turning with them, engaging with the eccentric spur-wheel H. The spindles $c$ are fitted so as to be capable of longitudinally sliding within or through the blind-wheel G, and springs $d$ are applied to hold the wheels I and pinions J out on said spindles when not doing work, and so to disengage them from the wheel H and pinion K, to prevent unnecessary wear. Furthermore, the hubs of the wheels I (see Fig. 3) are bored as large as the heads of the pins or spindles $c$, to allow said wheels to come out of gear, and, whenever said wheels are in gear—that is, any one of them at a time—with the pinion K, providing for the outside of the head of either pin or spindle $c$ coming even with the outside of the hub of its wheel I, and within an overhanging arm or bracket, M, on the lathe-head A. This bracket M serves to bring and retain in position either one of the wheels I to engage with the lathe-spindle pinion K whenever the blank wheel G is turned or adjusted for the purpose, the spring $d$ throwing and keeping said wheels I out of line or gear with the pinion K when said wheels pass from out of said arm or bracket. The pinions J which turn with the wheels I, and virtually are one with them, are on the inside of the wheels I and between them and the blind-wheel G. The arm or bracket M is beveled on its inside face, as at $e\,e$, (see Fig. 3,) to guide the wheels I into line or gear with the pinion K when said wheels I are brought one at a time within the arm or bracket. This bracket is not wholly or directly depended upon to hold such adjusted wheel I in gear with the pinion K, but it is provided with a lever, N, for holding or locking said wheel I in gear. This lever is a crooked one, having a bent lower arm, *f*, which, when the lever is in locking position, presents one straight face parallel, or thereabout, with the head A of the lathe, and which is long enough to engage with a slot, *g*, in each of the spindles *c* as they come in line with it, and so lock the wheel I on said spindle *c* in gear with the pinion K; but such lever, when pressed down from the outside, causing its inner bent arm, *f*, to be drawn upward, will be out of the way entirely of the gears I or their spindles *c*. When said lever is in lock with any of the spindles *c* it holds the blind-wheel G from turning, and so serves the double purpose of holding the working-wheel I in gear with the pinion K and the blind-wheel from turning. The long or handle-ended arm of this lever N is reduced in thickness toward its locking-arm portion *f*, to allow it to spring sidewise for the purpose of engaging it with a jog or notch, *h*, in the bracket M, to hold the lever from rising when in lock.

The lever E, which carries the pinion F, is provided with a latch, *i*, controlled by a spring, *k*. This spring-latch fits into notches *l* in the blind-wheel G to hold the lever E in position, and so that a pinion, O, on the opposite side of the lever to that on which the pinion F is arranged engages with any one of a series of pinions, P, carried by the blind-wheel G. This pinion O is fast upon the same spindle which passes through the lever E as the pinion F. The same spindles that carry the pinions P, which engage with the lever-pinion O, also carry other larger pinions, Q, which engage with the eccentric spur-wheel H. By this combination of mechanism motion is communicated by the one of the series of wheels I which has been put in gear with the pinion K from the lathe-spindle L, having a fixed number of revolutions, to the eccentric wheel H through the pinion J on the spindle of such gear-wheel I, and is transferred from the wheel H through the pinions Q and P in gear with said wheel, and with the lever-pinion O to the lever-pinion F, and from the latter to the spur-wheel B, from whence it is communicated by pinion C to the lathe-screw. The speed of said screw or shaft D relatively to the shaft or spindle L will depend upon the particular wheel and pinion of the series of different-sized wheels and pinions I J put into gear with the pinion K and eccentric wheel H by the shifting of the blind-wheel G through the lever E and spring-catch *i*, and upon the particular pinions of the series of pinions P Q put by the movement of the lever E in gear with the wheel H and pinion O. Only one pair of the series of pinions P Q is at any one time in gear with the eccentric wheel H and pinion O. The spindles *m*, upon which the pinions P and Q are fitted to turn in common, are capable of a longitudinally-sliding motion within or through the blind-wheel G, and an outside guard or frame, *n*, fast to said wheel. Springs *o* are applied to the outer ends of the spindles *m*, to throw and keep the pinions Q out of gear with the wheel H and the pinions P out of gear with the lever-pinion O, and within a chambered or reduced portion, *r*, of the blind-wheel G. This prevents wear of the several pinions or gears so disengaged. The lever E is made with sloping sides or faces *s s*, (see Fig. 4,) so that when thrown up or adjusted it will gradually press against the inner end of the spindle *m* of the particular pair of pinions P Q which it is required to work or put in gear with the wheel H and lever-pinion O, and force outward said spindle against the pressure of its spring *o*, and so put said wheel and pinions in gear, after which the lever E is locked by the spring-catch *i* to keep it in position. Thus the lever E not only serves to adjust or turn the blind-wheel G, but also to set any one pair of the series of pinions P Q in working gear or position. The pinion F, on the opposite side of the lever E to that occupied by the pinion O, is always engaged with the spur-wheel B, and when set in motion by engagement of the pinion O with any one of the pinions P of one pair of the series of pinions P Q motion is transmitted as required to the screw spindle or shaft D with the requisite speed relatively to the spindle or shaft L, the particular wheel and pinion of the series of differential gears I J necessary to produce a given velocity to the screw D having been adjusted by the turning of the blank wheel G to engage with the pinion K and wheel H, as hereinbefore described.

A rod or guide, *t*, may be arranged outside of the lever E to hold the lever up to the blind-wheel G.

Instead of the lever N passing through slots in the spindles *c*, it may fit into a groove in the head of each of them, and said spindles be riveted into the blind-wheel G and the lever N push each pinion J into gear.

Having thus described my invention, I claim as new and desire to secure by Letters Patent—

1. In a speed-changing mechanism, the combination, with the shafts L D and their respective pinions K C, of the spur-wheel B, the lever E, with its pinions O F, the blind-wheel or disk G, and its series of differential gears I J, the eccentric spur-wheel H, and the series of pinions P Q, carried by the blind-wheel G and arranged to engage with the eccentric wheel H and pinion O, substantially as specified.

2. In combination with the blind-wheel G, having a series of differential gears, I J, for operation, as described, in connection with the pinion K and eccentric wheel H, the loosely-fitted lever E, made capable of engaging by catch or fastening with the blind-wheel at different points, and engaging by gears through a series of pinions on the blind-wheel with said eccentric wheel and with a driving spur-wheel, B, essentially as and for the purposes herein set forth.

3. The differential gears I J, fitted on longitudinally-sliding spindles *c*, in combination with the disk or wheel G, which carries them, the springs $d$, the fixed arm or bracket M, having inclined guiding-faces $e\ e$, and the pinion K, substantially as described.

4. The locking-lever N, in combination with the sliding spindles $c$, in which it is fitted to engage, the gears I J, the springs $d$, and the blind-wheel G, essentially as and for the purposes herein described.

5. The lever E, having sloping guiding-faces $s\ s$, in combination with the sliding spindles $m$, the gears Q P, the spring $o$, the blind-wheel G, the eccentric spur-wheel H, and the lever-pinion O, substantially as specified.

BENJAMIN B. POWELL.

Witnesses:
HENRY A. ROLLINS,
JOHN E. HALL.